June 17, 1930.  E. NIELSEN  1,764,338
DRINK MIXER
Filed July 24, 1929
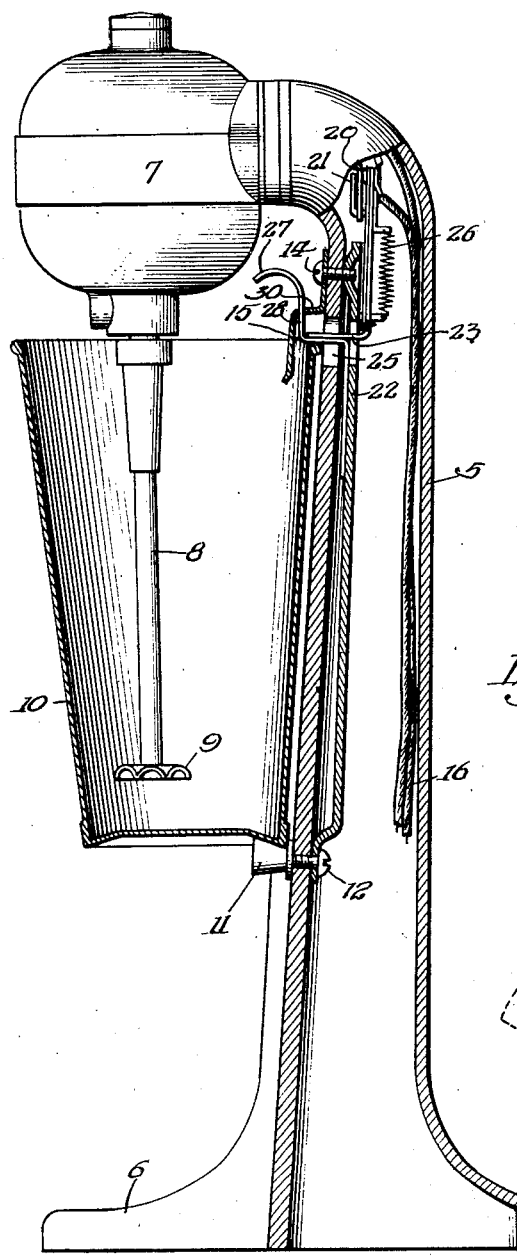
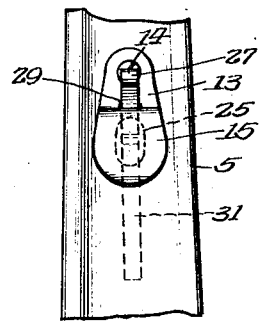
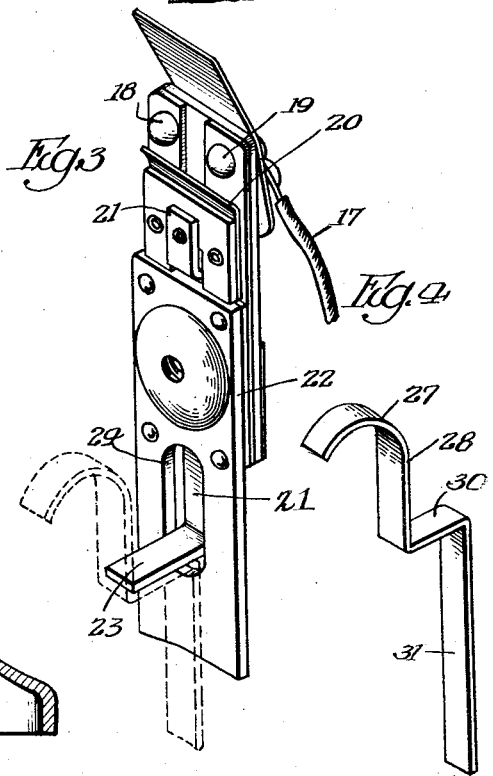
Inventor
Emanuel Nielsen
By Fred Gerlach his Atty Patented June 17, 1930

1,764,338

UNITED STATES PATENT OFFICE

EMANUEL NIELSEN, OF RACINE, WISCONSIN, ASSIGNOR TO HAMILTON BEACH MANUFACTURING COMPANY, OF RACINE, WISCONSIN, A CORPORATION OF WISCONSIN

DRINK MIXER

Application filed July 24, 1929. Serial No. 380,571.

The invention relates to electric drink mixers.

In the operation of drink mixers of the type in which the switch for controlling the motor for driving the agitator is automatically controlled by placement and removal of the container into and out of its operative position, it is sometimes desirable to operate the agitator while the container is manually held out of its operative position, for the purpose of fluffing the contents of the container, and for this purpose it has been proposed to provide a manually operable fingerpiece on the automatic or container operated shifting element for the switch. In some instances, the manual control is not desired.

One object of the invention is to provide an improved drink mixer of the aforementioned type with a simple device for manually controlling the motor switch, which device can be separately installed from the container-operated element for shifting the switch, so that, in the manufacture of the drink mixers, the customers may be supplied with or without the manual controlling device, without change in the aforesaid element or any of the switch-operating parts.

Another object of the invention is to provide a manually operable device for shifting the switch, which is separable from the container-operated element, and is guided in coacting relation therewith.

A further object of the invention is to provide an improved manually operable device which is mounted to slide vertically in the hook which extends into the upper portion of the container to retain the container in its operative position.

Other objects of the invention and the various advantages and characteristics of the present construction will be apparent from a consideration of the detailed description.

The invention consists in the several novel features hereinafter set forth and more particularly defined by claims at the conclusion hereof.

In the drawing which accompanies and forms a part of this specification or disclosure and in which like numerals of reference denote corresponding parts throughout the several views: Fig. 1 is a vertical section of a drink mixer embodying the invention, parts being shown in elevation. Fig. 2 is a front view of a portion of the standard, showing the retaining hook for the container, and the manually operable switch shifting device. Fig. 3 is a perspective of the switch for controlling the electric motor. Fig. 4 is a perspective of the device for manually controlling the switch while the container is out of its operative position.

The invention is exemplified in a drink mixer comprising a hollow standard 5 which rises from a base 6 and has an electric motor 7 secured to its upper end. A shaft 8 depends from the rotor of the motor 7, and has secured to its lower end, an agitator 9 for the contents of a container 10. A stud 11 is secured by a screw 12 to the front face of the standard 5 to support or serve as a rest for the bottom of the container. A plate 13 is secured by a screw 14 to the front face of the upper portion of standard 5, and is formed at its lower end with a hook 15 which is adapted to enter the open top of the container 10 to hold the latter in operative position on the stud 11. There is sufficient clearance below and around the agitator 9 to permit the container 10 to be inserted from below into its operative position by manual manipulation of the container itself. In placing the container into its operative position, its upper rim is guided into the hook 15 by the front face of standard 5, and its bottom portion is then moved backwardly into the stud 11.

The motor 7 is supplied with current by a pair of line conductors 16 and 17. The conductor 16 is directly connected to the field windings of the motor 7, and embodies a part which leads from the windings to a stationary contact 18. The other line conductor 17 is connected to a contact 19. These contacts are adapted to be bridged by a plate 20 to close the circuit through the motor, and cause the motor to run. When the plate is disengaged from said contacts, the circuit will be opened. Contacts 18 and 19 are insulated from each other, and suitably supported on a vertical bar 22 which is secured in the standard 5 by screws 12 and 14. The latter secure the stud 11 and the plate 13 to the standard. Bridge plate 20 is connected to a bar 21 which is mounted to slide vertically on a supporting bar 22. The specific construction of this switch is fully set forth in an application for Letters Patent filed by me March 24, 1928, Serial No. 264,467.

The lower end of bar 21, which shifts the bridge plate 20, is provided with a forwardly extending element or arm 23 which passes through, and is guided in, a vertical slot 24 in the supporting bar 22. Arm 23 extends forwardly through a slot 25 in the front of the standard 5 into position to be operated by the rim of the container 10. When the container is placed into its operative position around the agitator, the arm will be shifted into its raised position. In this position bridge-plate 20 will engage contacts 18 and 19 and close the motor circuit. A spring 26 is connected to retract bar 21 and bridge-plate 20 when arm 23 is released by removal of the container.

The device for manually shifting bar 21 to close the switch when the container 10 is out of its operative position, consists of a strip of metal bent to form a curved finger-piece 27, a vertical member 28 which is adapted to slide vertically in a slot 29 in the hook plate 13, a horizontal member 30 adapted to underlie or fit against the underside of arm 23 and to extend through slot 25 in the standard, and an inner leg 31 which fits against the front face of the supporting bar 22.

When the user desires a mixer with the manually operable device, the leg 31 is inserted through the slot 25 so that its horizontal portion 30 will underlie the arm 23 and the plate 13 is passed around the finger-piece 27 and secured to the standard by screw 14. When the mixer is used with the manually operable finger-piece, the upper edge of the container 10 will engage horizontal portion 30 of said device, which will shift the arm 23 upwardly to close the switch. When it is desired to furnish a drink mixer without provision for manually shifting the motor switch, the device is omitted. When the mixer is furnished without the manually operable device the container 10 engages directly arm 23 to control the switch.

The invention exemplifies a drink mixer of the type in which the container is adapted automatically to operate the switch for controlling the motor, in combination with a separate or supplemental finger-piece which can be inserted into operative position when it is desired to provide for the manual control of the motor while the container is out of its operative position. By utilizing a strip of metal in the construction of the manually operable device, the device may be manufactured at a comparatively low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a drink mixer, the combination of a standard, an electric motor mounted on the standard, a shaft driven by the motor and provided with an agitator, means for retaining a container in operative position beneath the motor, a switch for controlling the operation of said motor, a switch operating element extending into position to be operated by the top of the container, and a finger-piece for manually operating the switch when the container is out of its operative position, said finger-piece being associated with, but unattached to, the switch-operating element.

2. In a drink mixer, the combination of a standard, an electric motor mounted on the standard, a shaft driven by the motor and provided with an agitator, means for retaining a container in operative position beneath the motor, a switch for controlling the operation of said motor, a switch operating element extending into position to be operated by the top of the container, and a vertically movable strip for manually operating the switch when the container is out of its operative position, said strip being formed separately from the switch-operating element and having a member underlying said element and a finger-piece.

3. In a drink mixer, the combination of a standard, an electric motor mounted on the standard, a shaft driven by the motor and provided with an agitator, means for retaining a container in operative position beneath the motor, a switch for controlling the operation of the motor, a vertically slidable switch operating element extending into position to be operated by the top of the container, and a finger-piece for actuating the switch-operating element in order to control manually the motor when the container is out of its operative position, said finger-piece being formed separately from and slidable independently of the element.

4. In a drink mixer, the combination of a standard, an electric motor mounted on the standard, a shaft driven by the motor and provided with an agitator, means for retaining a container in operative position beneath the motor comprising a depending hook adapted to enter the top of the container, a switch for controlling the operation of the motor, a vertically slidable switch operating element extending through the front of the standard and into position to be shifted by the top portion of the container in the hook, and a strip for manually operating the switch when the container is out of its operative position, said strip being formed separately from and slidable with the switch-operating element and embodying a vertically extending finger-piece extending upwardly through an opening in the top part of the hook.

5. In a drink mixer, the combination of a standard, an electric motor mounted on the standard, a shaft driven by the motor and provided with an agitator, means for retaining a container in operative position beneath the motor comprising a hook adapted to enter the top of the container, a switch for controlling the operation of the motor, a switch operating element extending through the front of the standard and into position to be shifted by the top portion of the container in the hook, and a vertically slidable strip for manually operating the switch when the container is out of its operative position, said strip being formed separately from the switch-operating element and embodying a member underlying said element and a finger-piece above the hook.

6. In a drink mixer, the combination of a standard, an electric motor mounted on the standard, a shaft driven by the motor and provided with an agitator, means for retaining a container in operative position beneath the motor comprising a hook adapted to enter the top of the container, a switch for controlling the operation of the motor, a switch operating element extending through the front of the standard and into position to be shifted by the top portion of the container in the hook, and a vertically slidable strip for manually operating the switch when the container is out of its operative position, said strip being formed separately from the switch-operating element and embodying a member underlying said element, a finger-piece above the hook and a leg in the standard.

7. In a drink mixer, the combination of a standard, an electric motor mounted on the standard, a shaft driven by the motor and provided with an agitator, means for retaining a container in operative position beneath the motor comprising a plate having a hook adapted to enter the top of the container, a switch for controlling the operation of the motor, a vertically slidable switch operating element extending through the front of the standard and into position to be engaged by the top portion of the container in the hook, and a strip for manually operating the switch when the container is out of its operative position, said strip being formed separately from the switch-operating element and embodying a finger-piece above the hook and a part slidably guided by said plate and the standard.

8. In a drink mixer, the combination of a standard, an electric motor mounted on the standard, a shaft driven by the motor and provided with an agitator, means for retaining a container in operative position beneath the motor comprising a plate having a hook adapted to enter the top of the container, a switch for controlling the operation of the motor, a vertically slidable switch operating element extending through the front of the standard and into position to be engaged by the top portion of the container in the hook, and a strip for manually operating the switch when the container is out of its operative position, said strip being formed separately from the switch-operating element and embodying a member underlying said element, a finger-piece above the hook, and a leg slidably guided by said plate and extending into said standard.

Signed at Racine, Wisconsin, this 20th day of July, 1929.

EMANUEL NIELSEN.